US012558746B2

(12) United States Patent
Hsu

(10) Patent No.: US 12,558,746 B2
(45) Date of Patent: Feb. 24, 2026

(54) MONITORING SYSTEM EMPLOYING SMART GLOVES TO ANALYZE OPERATOR FABRICATION ACTIVITIES

(71) Applicant: The ESAB Group Inc., North Bethesda, MD (US)

(72) Inventor: Christopher Hsu, Elkridge, MD (US)

(73) Assignee: The ESAB Group Inc., North Bethesda, MD (US)

( * ) Notice: Subject to any disclaimer, the term of this patent is extended or adjusted under 35 U.S.C. 154(b) by 480 days.

(21) Appl. No.: 18/104,418

(22) Filed: Feb. 1, 2023

(65) Prior Publication Data

US 2023/0166366 A1    Jun. 1, 2023

Related U.S. Application Data

(63) Continuation of application No. PCT/US2021/045339, filed on Aug. 10, 2021.

(60) Provisional application No. 63/064,462, filed on Aug. 12, 2020.

(51) Int. Cl.
 B23K 37/006        (2025.01)

(52) U.S. Cl.
 CPC .................................. B23K 37/006 (2013.01)

(58) Field of Classification Search
 CPC ................ B23K 37/006; G05B 19/409; G05B 19/41875; G05B 2219/32001; G05B 2219/32002; G05B 2219/32148; G05B 2219/35448; G05B 2219/40202; G05B 19/4183; G06Q 10/06395; G07C 1/00; Y02P 90/02
 See application file for complete search history.

(56) References Cited

U.S. PATENT DOCUMENTS

| 8,274,013 B2 | 9/2012 | Wallace |
| 8,622,795 B2 | 1/2014 | Edis et al. |
| 10,748,442 B2 | 8/2020 | Batzler et al. |

(Continued)

FOREIGN PATENT DOCUMENTS

| AT | 502283 A1 | 2/2007 |
| JP | 2019018240 A | 7/2017 |

(Continued)

OTHER PUBLICATIONS

Vrtrix Digital Gloves, http://www.vrtrix.com/product/2017-10-18/4.html.

(Continued)

*Primary Examiner* — Manuel A Rivera Vargas
(74) *Attorney, Agent, or Firm* — Edell, Shapiro & Finnan, LLC

(57)        ABSTRACT

A method and apparatus includes a monitor in communication with, e.g., a work glove with built-in sensors to track an operator's physical activities including intermittently using hand tools, hand motion, and position or location in a work area. The sensors provide time-series data representative of the activities, and the monitor classifies and sequences the activities based on the time-series data along with, optionally, machine tool operational data. The classified and sequenced activities may then compared to instructed work procedures, ensuring correct work materials are used in production, and ensuring an operator's safety by detecting unsafe or abnormal work conditions.

20 Claims, 3 Drawing Sheets

(56)  References Cited

U.S. PATENT DOCUMENTS

| | | | |
|---|---|---|---|
| 2016/0214198 A1 | 7/2016 | Hsu | |
| 2016/0361776 A1 | 12/2016 | Zhang | |
| 2017/0080509 A1* | 3/2017 | Pfeifer | B23K 9/0956 |
| 2018/0314937 A1* | 11/2018 | Zarar | G06N 3/09 |
| 2019/0243344 A1 | 8/2019 | Bauer et al. | |
| 2020/0113258 A1 | 4/2020 | Guenther et al. | |
| 2023/0009480 A1* | 1/2023 | Huang | A61B 5/6807 |

FOREIGN PATENT DOCUMENTS

| | | | |
|---|---|---|---|
| WO | 2019018240 A1 | 1/2019 | |
| WO | 2019202854 A1 | 10/2019 | |
| WO | 2020079504 A1 | 4/2020 | |

OTHER PUBLICATIONS

Noitom's Hi5 VR Glove, Noitom Motion Capture Systems, https://www.noitom.com/hi5-vr-glove.

VRGluv, https://www.vrgluv.com/.

ProGlove, https://www.proglove.com/products/wearable-scanners/wearables/.

Notification of Transmittal of the International Search Report and Written Opinion including International Search Report and Written Opinion for International Patent Application No. PCT/US2021/045339 dated Nov. 18, 2021, 16 pages.

* cited by examiner

RECEIVE TIME-SERIES DATA FROM A SENSOR INCORPORATED INTO PERSONAL PROTECTIVE EQUIPMENT (PPE) WORN BY AN OPERATOR, THE TIME-SERIES DATA BEING REPRESENTATIVE OF ACTIVITY PERFORMED WITH THE PPE — 302

ANALYZE THE TIME-SERIES DATA — 304

CLASSIFY THE ACTIVITY PERFORMED WITH THE PPE BASED ON THE TIME-SERIES DATA — 306

MONITORING SYSTEM EMPLOYING SMART GLOVES TO ANALYZE OPERATOR FABRICATION ACTIVITIES

This application is a continuation of International Patent Application No. PCT/US2021/045339, filed Aug. 10, 2021, which claims the benefit of U.S. Provisional Patent Application No. 63/064,462, filed Aug. 12, 2020, the entire contents of which is incorporated herein by reference.

TECHNICAL FIELD

The subject disclosure relates to a monitoring system for tracking the activity of an operator, such as a welder, wearing industrial gloves.

BACKGROUND

Many arc welding and plasma cutting equipment manufacturers offer IoT-equipped products (e.g., ESAB's Weld Cloud and Cut Cloud) to track operational data during production. The data being monitored relates to key machine tool operational data, such as current, voltage, wire feed speed, etc., for manually operated equipment, and richer data for automated welding. Although much factory-bound industrial equipment for series production is rated at 100% duty cycle, the actual "arc-on time" rarely exceeds 10% when operated by human welders. In practice, besides welding with an arc, a human welder is also involved in pre-welding and post-welding activities, reading drawings and work instructions, setting up equipment, loading and unloading the part to be welded, engaging/disengaging weld fixtures, waiting for incoming materials, engaging and disengaging clamps in the weld fixtures, adjusting fit-ups, preparing the weld joint before welding, grinding, replenishing the welding wire, replacing burned contact tips, cleaning liners and nozzles, inspecting weld quality, and making repairs or touch-ups as needed. From a time-share perspective, most of the operator's time (e.g., 90%) is unaccounted for by monitoring the machine tool's (e.g., welding equipment's) operational/output data (such as arc current and voltage) alone.

Arc-on time is often used synonymously with "productivity" in the IoT features of weld equipment marketing communications; however, it is more accurately and technically merely "machine utilization" and does not offer any additional insight into how to improve arc-on time for a fabricator. Furthermore, more arc-on time does not necessarily equate to more parts produced per production period, because the operator is often multi-tasked with the goal of quality parts produced in the shortest production time, which involves more than just welding as the sole task. Indeed, more arc-on time percent may cause more work downstream in, for example, clean-up or repair. Thus, there is a need to understand and monitor welding operator activities outside of arc-on time to drive impactful improvement in true productivity that is meaningful and actionable to a fabricator's production.

Another problem that lacks a cost-effective solution is the compliance of weld procedures, workflow, or sequences involving multiple welds to be performed on the same part in an order of sequence per pre-qualified weld specification. One solution involves the operator looking up to a Human-Machine Interface (HMI) screen that displays proper workflow in a drawing as the work progresses, which is effectively a dynamic visual aid without actual activity measurement or compliance verification.

Yet another problem involving human manufacturing activities is compliance with safety rules and regulations. It is not easy to fully ensure that the operator is properly wearing PPE such as work gloves for certain fabrication tasks such as welding. Further, it would be desirable to shut down power in response to an operator experiencing an acute health condition when, e.g., operating a hand tool that generates temperatures that melt metal and/or that operates at voltages that exceed 50V.

Although motion sensors can be embedded in hand tools such as a welding torch (US20160361776A1, US20160214198A1, and WO2019202854A1), an operator's activities may go beyond holding a torch, e.g., loading and unloading parts without a torch in hand. Furthermore, a welding operator is often tasked to use multiple hand tools in the work area besides the welding torch, such as a mallet to ensure proper part fit-up, a grinder to clean off spatter or weld flash, a bottle to spray anti-spatter fluid, pliers to sharpen a wire end, and tools associated with production change-over or part handling such as a hoist. Since these hand tools/products are made by different manufacturers, it is nearly impossible to get all of them to agree to an IoT standard for interoperability so that a complete picture can be assembled to digitize most of the operator's activities in a workstation.

Activity trackers are now ubiquitous, such as the Apple Watch and Fitbit, as are telematics devices in vehicles, which have been advanced by car insurance companies to monitor driver behavior. Smart gloves and/or virtual reality (VR) gloves are commercially available for entertainment, warehousing, medical, and industrial training purposes. Vrtrix (Beijing, China) has a glove for gesture and finger tracking. Noitom's (Beijing, China) Hi5 glove has gesture and pose tracking. VRGluv (Atlanta, GA) offers a haptic glove that combines hand/finger tracking and force feedback for virtual reality training. ProGlove (Chicago, IL) has a built-in barcode scanner.

Motion tracking is often built with inertial measurement unit (IMU) sensors (gyroscopes and accelerometers) or infrared cameras (e.g., optical whole-body motion capture systems) tracking passive retroreflective or active LED markers or a constellation affixed to the object being tracked, such as wearables, like a glove, or a hand tool like a welding torch, for gaming or virtual/augmented reality training or robot teleoperation. For IMU-based motion tracking, magnetometer or geomagnetic sensing is often used for calibration (or drift compensation). However, they may not work well in a work area full of large metal structures (e.g., a ship) and electromagnetic interference from welding equipment. An array of IR cameras in an optical motion capture system are not practical outside a defined training cell for on-the-job motion tracking.

JP2019018240A discloses a welding glove with a pocket to house a three-axis acceleration sensor and a three-axis angular acceleration sensor (accelerometer or gyroscope) or inclinometer to measure the travel speed and welding angle of the torch and heat input.

AT502283A1 discloses 3D position sensors embedded in a welding torch or a welding glove or bracelet for process monitoring or control.

U.S. Pat. No. 8,274,013B2 discloses the use of a variety of sensors (acoustical, optical, infrared, magnetic, RF, laser, and inertial) embedded in a welding torch to track dynamic spatial properties of the torch, such as its speed, angle, and welding trajectory.

U.S. Ser. No. 10/748,442B2 discloses position and orientation sensors for a torch, helmet, glove, or wrist band, as part of a welder training system.

U.S. Pat. No. 8,622,795B2 discloses hand activities analysis of a boxer having an accelerometer disposed on the hand of the boxer.

SUMMARY

A human operator monitoring system is disclosed which takes time-series data from sensors embedded in the operator's work glove to track motion and/or position, output signals from a machine tool, and RF tags in the work zone and on work material. The monitoring system classifies operator activities at least into idle, operating machinery and non-machinery operating activities, and more elaborate activity characterizations using machine learning and serves as a watchdog for unsafe or abnormal conditions. The monitoring system is also capable of checking compliance of specified work time-spatial procedures and human mistakes in executing prescribed work procedures, and confirming that the proper work material is used for production.

DETAILED DESCRIPTION

Described below is a system and methodology that leverages industrial gloves, which are worn for the safety of human operators in many manufacturing operations. The gloves can be an Internet of Things (IoT) wearable article, with built-in sensors for sensing motion, location, work object identification, etc. As a special use case, the protective work gloves may be used by a welder as personal protective equipment (PPE) while operating welding equipment, including welding or cutting torches.

Figure 1:
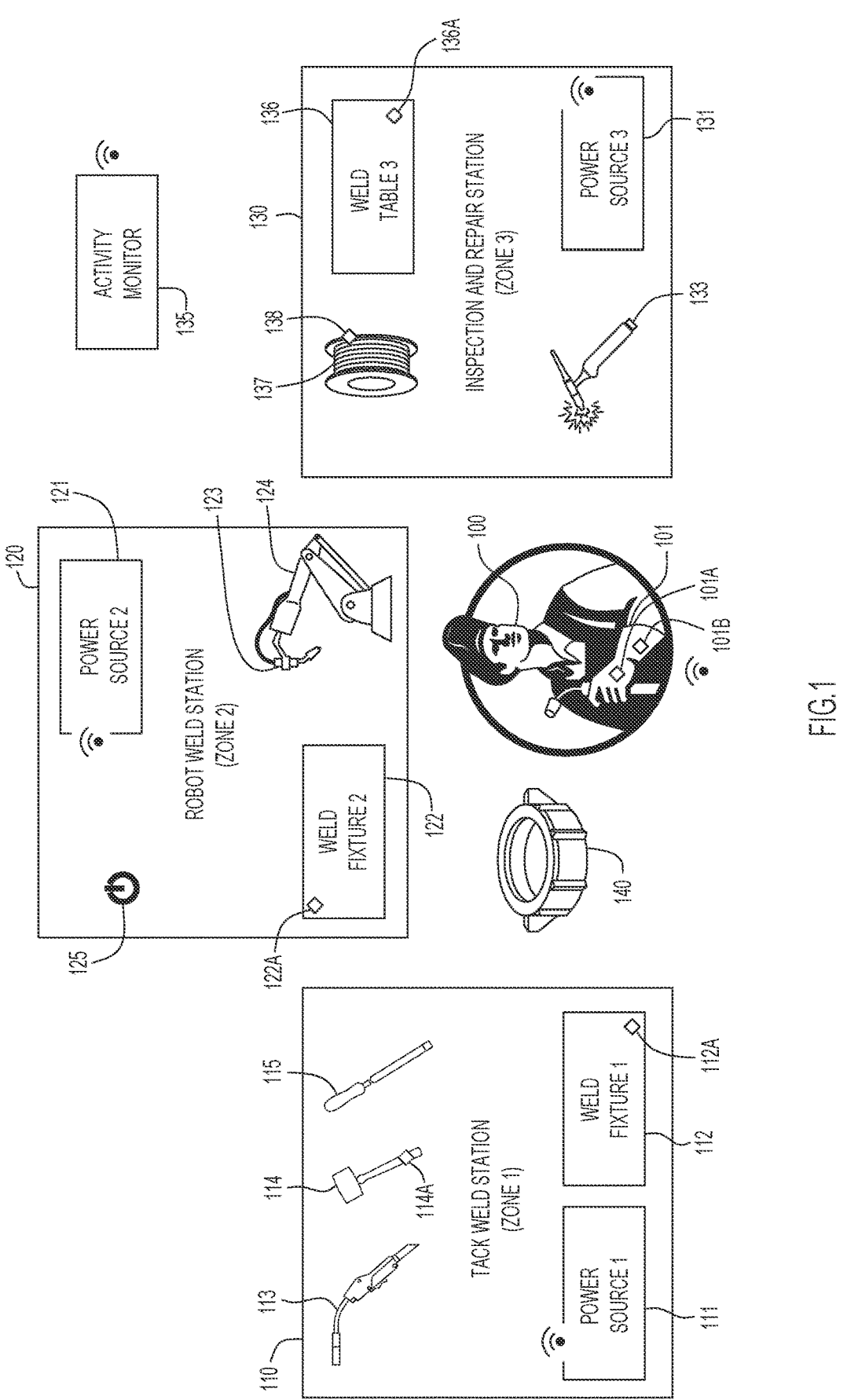
FIG. 1 shows a multi-zone work cell illustrating operator activities characterized in a mixed manual/robotic operation, according to an example embodiment.

Referring to FIG. 1, an operator 100 works in a multi-zone work cell comprising a tack weld station 110 (Zone 1), a robot weld station (Zone 2 120), and an inspection and repair station 130 (Zone 3). Operator 100 is required by workplace labor regulatory agencies such as OSHA and his/her employer's factory safety regulations to wear protective flame-resistant gloves 101, which include sensors 101A while working in the work cell. Operator 100 may perform any one or more of many activities in the work cell. For example, operator 100 may load a production part 140, which may have several physical pieces, into a weld fixture 112 ("weld fixture 1") in Zone 1 110, make fit-up adjustments using a mallet 114 and clean up the joint using scraper 115. Operator 100 may then proceed to make tack welds in part 140 using a manual power source 111 ("power source 1") and torch 113. After completing tack welding, operator 100 may unload part 140, move part 140 to Zone 2 120 (robot weld station), load part 140 into a weld fixture 122 ("welding fixture 2"), and push a cycle start button 125 at the robot weld station zone 2 120. After a robot 124 with a robotic torch 123 and robotic power source 121 ("power source 2") completes the robot weld cycle, operator 100 may unload part 140 from weld fixture 122, move part 140 to Zone 3 130 (inspection and repair station), inspect the robot weld quality, and make touch-up or repair welds using torch 133 and manual power source 131 ("power source 3"). When operator 100 completes the touch-up/repair welds, operator 100 may move the welded and inspected part 140 out of Zone 3 and may stack it in a work-in-process outflow area of the work cell (not shown).

According to an exemplary embodiment, the operator's activities in the work cell are monitored by activity monitor 135. Specifically, activity monitor 135 is configured to receive arc signals (e.g., operating condition signals such as voltage, current) output from the welding power sources 111, 121, 131 together with motion and/or position data of gloves 101. Gloves 101 include (embedded) sensors 101A to track motion, such as acceleration and orientation, velocity, and spatial position trajectory either by position receiver or by algorithms on motion sensors data. The combination of glove activities, location, and the welding power sources' output signals can be used together to reconstruct or classify the physical tasks of operator 100. Referring to Table 1, the operator's activities can be grouped into four categories by analyzing the output of glove sensors 101A and welding power sources 111, 121, and 131: idle (neither gloves 101 nor manual welders are active); non-welding active (gloves 101 are moving but no power source is supplying power); welding, i.e., normal manual welding (both gloves 101 and manual power source 111 or 131 are active); and abnormal conditions. The operator's time distribution over the entire shift can be tallied into these four groups, trended over time, and workflow in the work cell can be optimized accordingly. Operator 100 can work in Zone 1 or Zone 3, while robot 124 is simultaneously welding in Zone 2, and their activities can be balanced and dovetailed. Several scenarios of the operator's activities are listed in Table 1. When both the gloves 101 and welding power sources 111, 131 are inactive (case A), operator 100 could be on a break or simply waiting for something (e.g., delivery of un-welded parts to the work cell) or someone (e.g., maintenance crew to fix a machine fault). The idle time outside normal break time is considered one form of waste in production. When gloves 101 are moving but there is no output from either of the manual power sources 111, 131, operator 100 could be loading/unloading part 140 a given zone (case B), carrying part 140 in-between zones (case C), using mallet 114 to tap fit part 140 into fixture 112, or using scraper 115 to clean and prepare the weld joint for robotic welding (case D). Case C is of special interest because unnecessary motion/walking is a leading cause of waste in production and the data could lead to improved work cell layout, material handling or human-assistive devices. Two examples of welding cases are listed when both gloves 101 and manual torch 113 or 133 are active, in tack welding (case E) and repair welding (case F). Several cases of abnormal/unsafe conditions are also listed, such as welding without gloves 101 (case G) and operator 100 having an acute health condition while the manual welding arc is on (case H). The system may generate an alert or warning and may even lockout or power down the machine tool as a precaution.

TABLE 1

| | | | | | | | | | | |
|---|---|---|---|---|---|---|---|---|---|---|
| Layering glove motion with welding power sources output to classify operator activities | | | | | | | | | | |
| Case | Gloves moving | Motion behavior | Move envelope | Gloves location | PS 1 | PS 2 | PS 3 | Arc behavior | Activity classification | Activity Example |
| A | No | n/a | n/a | any | off | off | off | n/a | idle | rest/meal break |
| B | Yes | tap | in arm's reach | zone 2 | off | off | off | n/a | non-welding active | Load/unload part in a robot cell |
| C | Yes | steady | >arm's reach | any | off | any | off | n/a | non-welding active | walking |
| D | Yes | swing | In arm's reach | zone 1 | off | any | off | n/a | non-welding active | Fitting or scraping |
| E | Yes | still | Zero | zone 1 | on | any | off | short-arc time | welding | spot tack |
| F | Yes | steady | In arm's reach | zone 3 | off | any | on | steady output | welding | repair welding |
| G | No | n/a | n/a | zone 1 | on | any | off | steady output | abnormal | welding without glove in zone 1 |
| H | Yes | erratic/still | In arm's reach | zone 3 | off | any | on | steady output too long | abnormal | non-volitional motion in zone 3 |

Besides tapping and swinging a hand tool, operator 100 may be tasked with other non-welding activities. These may include changing contact tips, changing torch liners, cutting the wire end, replacing a wire spool, grinding off spatter and weld splash, cleaning up the work area, climbing the mezzanine stairs to adjust the welding power source parameters, radioing and waiting for a maintenance crew to fix a machine/robot fault, etc. During welding, operator 100 may practice special torch motion patterns such as stringer pass, walking-the-cup, concave/convex weave, triangular weave, etc. To discern these non-welding activities and welding torch manipulation techniques, activity monitor 135 (which may be embodied as a computer, processor, or server with logic instructions coded therein on non-transitory media, and executed thereby) may process the glove motion sensor data, weld equipment data, and other sensor data using machine learning for time-series classification (TSC). Both supervised and unsupervised learning can be used for algorithm training and validation, and big data analytics can be applied to aggregated data from many glove-wearing workers in factories. Distance-based classification, e.g., K-nearest neighbors (KNN) with dynamic time warping (DTW), or support vector machines (SVM) may be used. Alternatively, interval-based algorithms, e.g., random forest or time series forest by splitting data with sliding window, extracting features, and then training decision tree classifier, may be used. Moreover, deep learning with architectures such as convolutional neural networks (CNN), and recurrent neural networks (RNN) such as Long Short-Term Memory (LSTM) and gated recurrent unit (GRU), can be used to classify multivariate time series from glove sensors 101A, welding equipment, and other sensors to gain more granular insight into the operator's activities with and without welding. CNN is preferred when the training data is abundant while RNN and SVM are preferred when data is scarce.

Referring still to FIG. 1, it is noted that operator 100 changes handheld torches 113, 133 from Zone 1 to Zone 3, but typically continues to wear the same gloves 101. Including a motion tracker as part of glove sensors 101A in the operator's gloves 101 enables tracking of the welding torch motions in both locations. Use of the same gloves 101 is common in the industry. For example, in pipe welding where the root pass is often performed with a torch loaded with solid wire, and fill passes are made by another torch loaded with flux-cored arc welding (FCAW) wire, operators use the same gloves to operate both torches. Furthermore, the welding operator is often expected to use unpowered hand tools such as a mallet, chisel, and brush without IoT sensors, which makes placing an activity tracker in the gloves much more appealing than outfitting all the tools used with IoT connectivity.

Figure 2:
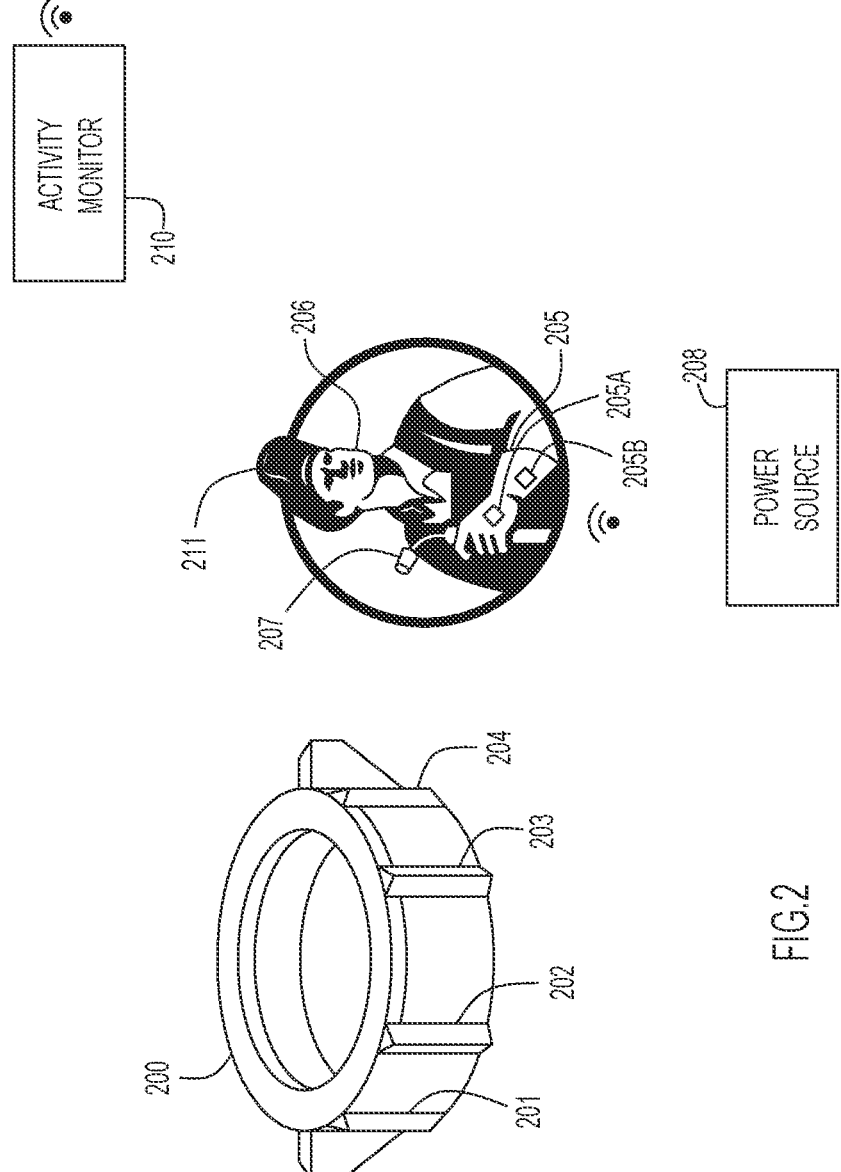
FIG. 2 illustrates a work sequence of a part that is mapped so that tasks are performed in a particular order, according to an example embodiment.

According to another exemplary embodiment, and referring to FIG. 2, operator 206 is tasked to make four welds 201-204 in part 200. Due to distortion management needs, the weld procedure specifies that operator 206 weld in order of 201 first, then 203, and then 202, and finally 204. When the glove position and welding power source output are monitored simultaneously, the actual weld sequence the operator uses can be monitored by glove sensor 205A. For example, glove 205 is positioned at the location of weld 201 when the welding power source 208 output is turned on for weld 201. Then, glove 205 is supposed to move to the location of weld 203 before the power source 208 output is turned on again for weld 203. If operator 206 moves the glove to the location of weld 202 and pulls the welding torch trigger after completing weld 201, then this out-of-sequence action is detected and recorded, and possibly an alert is given to the operator 206 or possibly the power source output is disabled until the operator 206 moves the glove 205/torch 207 to the location of weld 203. The sequence monitoring software (i.e., logic instructions) running inside glove sensor 205A or activity monitor 210 (or 135) can also detect missing welds. For example, if operator 206 forgets to complete weld 204, an alert is given to the operator 206 when he tries to open the clamps of weld fixture to release workpiece 200, or possibly disallowing fixture clamp opening until all four welds are welded according to activity monitor 210 (or 135). Another example is if operator 206 attempts to make a weld in a location other than 201-204 (wrong weld location) due to a mismatch between the glove location and the weld location in the drawing during the sequence or manufacturing routine. In this case, an alert can be given to operator 206, or the power source output can be disabled, or the operator 206 can be prompted to move to the next weld location via an HMI. The alert can be provided through a vibrator, speaker, buzzer, LED, or LCD built into the smart glove as an HMI.

Referring still to FIG. 2, operator 206 may be tasked with performing weld 201. The task may consist of eight distinct steps in which the operator: a) flips down his hood 211; b) moves the torch 207 to the beginning of weld 201; c) pulls torch 207 trigger to strike an arc; d) moves the torch along the joint of weld 201 until the weld end is reached; e) pauses the torch and performs crater fill; f) releases the trigger to extinguish the arc; g) moves the torch 207 away from the location of weld 201; and h) flips up his hood 211. The hand motion and position of each of these steps are distinct from each other. By tracking the glove movement, these steps can be digitized, classified and analyzed. For example, steps a) and b) are collectively pre-weld activities, steps c) thru f) are arc-on welding activities, and steps g) thru h) are post-weld activities. If the output of the welding power source 208 is layered into the activity monitor 210 (or 135) as additional data input, the characterization of these steps can be easier. This illustration of pre-weld and post-weld activities is for simple explanation purposes only. The pre-weld and post-weld activities in real production involve many more activities, such as pre-weld joint preparation and post-weld cleaning or grinding with gloves 205 (or 101).

To determine glove position and location, miniature IMUs (inertial measurement units) or WIMUs (wireless IMU) may be disposed on a control board with, e.g., Kalman filtering, wireless transmission or communication device, and battery power, and incorporated into glove 101, 205. An IMU may make use of a mechanism to reset drift accumulated over time. One method to reset drift is to calibrate the IMU when the glove 101, 205 is in a known position, such as when the operator is pushing the robot cycle start button 125 in zone 120 in FIG. 1. Alternatively, a contact sensor or switch may be incorporated as part of a torch holder in fixture 112 and/or table 136 as known locations to park the torch after welding and reset the drift. Besides IMUs, other sub-meter positioning technology may be used, such as Bluetooth low energy (BLE) beacons, ultra-wideband (UWB), 5G mmWave, and visible light communication (VLC). These local positioning technologies may be cost-effective for the zone identification use case described in FIG. 1 and the first exemplary embodiment and may be accurate enough for the fabrication of large structures such as ships, bridges, and pressure vessels where the work cell is vast.

It is also possible to incorporate a force transducer (or sensor) in the work gloves 101, 205 to generate additional sensory data. Such a transducer may provide information such as the weight an operator is carrying to facilitate activity classification. For example, the weight of a welding wire spool 137 is different from the weight of a torch or a workpiece, or a contact tip. The force transducer can be part of the glove sensors 101A, 205A in glove 101, 205.

It is also possible to incorporate acoustic emission sensors, e.g., dynamic microphones in the work gloves 101, 205 to record the sound generated by various work activities. The sound of welding would be distinguished from the sound of a mallet or a scraper. Even within the welding activity, the "frying bacon" sound of normal welding can be distinguished from abnormal hissing (voltage too high) and popping (voltage too low). Abuse of the weld tool such as using the torch as a hammer can be detected by correlating the acoustic emission data of hammering and the IMU data of glove shaking. The noise level captured by the microphone may also serve as a monitoring guard rail to comply with the regulation on occupational noise exposure (e.g., 85 decibels).

It is also possible to incorporate a temperature sensor in the work gloves 101, 205 to sense the temperature of a touched object or even of flames in an unsafe condition. In one possible use case, welding may not commence until the workpiece is preheated to a certain temperature according to the welding procedure.

An optical sensor, such as a barcode scanner or QR code scanner may also be incorporated into glove 101, 205 to capture barcodes or QR codes.

It is still also possible to incorporate near-field communication (NFC) or a radio frequency identification (RFID) reader chipset or module 101B or module 205B to detect and identify hand tools with NFC/RFID tags affixed to them. In FIG. 1, NFC tag 114A is affixed to mallet 114 and NFC reader or module 101B is positioned inside the glove 101 so that NFC tag 114A will be read when operator 100 picks up mallet 114 with glove 101. Tag 112A is affixed to weld fixture 1 (112) in Zone 1. Tag 122A is affixed to weld fixture 2 (122) in Zone 2. Tag 136A is affixed to weld table 3 136 in Zone 3 130 because repair welding often does not require a fixture. When NFC reader or module 101B gets close to these zone-specific tags, it can detect the glove location and thus the operator's whereabouts inside the work cell. In the case of NFC, a touch or very close proximity is often required to read the tag, whereas RFID operates within a given range. In the case of RFID, the tags can be spaced far apart so that only one RFID tag can be read within a zone at a time (and not multiple RFID tags simultaneously). Similarly, NFC or RFID reader or module 101B in the glove 101 can also identify work material affixed with NFC tag 138 on welding wire spool 137 in FIG. 1 to ensure the correct filler metal is used in actual production based on the work order and welding procedure specification (WPS), and alert the operator 100, 206 or pause production when a discrepancy is found.

Although the exemplary embodiments describe activity classification using both motion and location data from the welding glove together with data from machine tool or welding power source, and optionally with RFID/NFC tags, the monitoring can be performed with either glove motion, or glove location data alone, with or without data from machine tools or RFID/NFC tags. Using fewer data sources has the advantage of less complexity and less cost but at the expense of lower performance in data mining or activity classification. The use of machine learning with glove sensor data alone in the absence of abundant multi-sensory input may be more important in accurately detecting unsafe work conditions, as a skewed class problem where recall is more important than precision.

Although the exemplary embodiments depict activity monitors 135 and 210 as a physical box with on-board electronics, wireless communications, and software inside the work cell for illustration purposes, the actual implementation may have the monitor as a logical device in the cloud to run algorithms, in one of the power sources as a master controller, inside a robot or programmable logic controller (PLC) or automation controller, or in an edge computing device. For example, the training of algorithms may be performed in the cloud while inference can be performed on edge devices.

Figure 3:
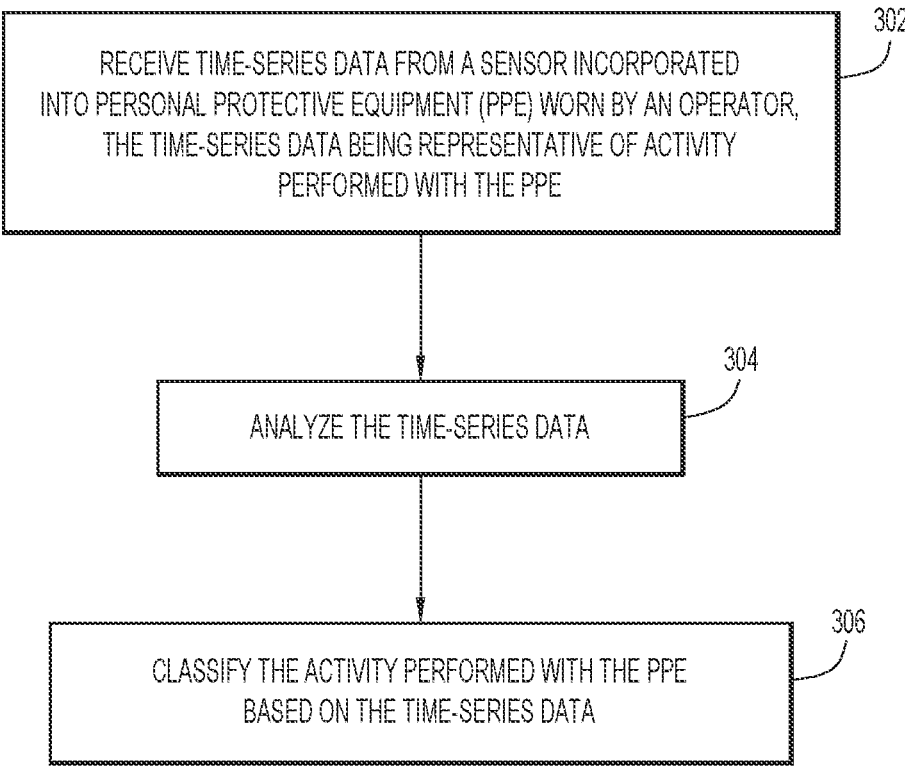
FIG. 3 shows a series of operations for monitoring the activities of an operator wearing PPE with sensors incorporated therein, according to an example embodiment.

FIG. 3 shows a series of operations for monitoring the activities of, e.g., a machine tool operator wearing PPE with sensors incorporated therein in a work cell, according to an example embodiment. At 302, an activity monitor receives time-series data from a sensor incorporated into personal protective equipment (PPE) worn by an operator and, optionally, time-series data from the machine tool, the time-series data being representative of activity performed with the PPE. At 304, the activity monitor analyzes the time-series data, and at 306, such as feature extraction to reduce the number of features in a large dataset with sufficient accuracy, the activity monitor classifies the activity performed with the PPE based on the time-series data by means of machine learning such as model training and inference.

As a commercial implementation of the described monitoring system, it is expected that the sensors, control circuit, and battery are miniature, lightweight, and able to withstand shock, impact, heat, humidity, and electromagnetic interference (EMI). Wireless communications to a system controller are provided to combine the glove data with data from welding equipment. The glove may be charged wirelessly through a glove stand with magnetic induction with battery status and charge indicators.

By monitoring glove motion and location on-the-job, as opposed to a simulated or virtual/augmented/mixed reality environment with an array of cameras for operator training, a bigger picture in a welding operator's activities can be revealed, which can provide insight into why the arc-on time is too low in real production. Manufacturing engineers and production supervisors may use glove activity tracking to compare seasoned operators with novice operators and derive/refine standard work/work cell designs to eliminate unnecessary motions and waiting. The hand activities tracking data collection can be used for value stream mapping, to quantify or eliminate waste, and improve overall productivity. It also allows fabricators to track actual human operations against procedures and whether any mistakes are made either in sequence or in compliance with the drawings or manufacturing specifications, or wrong materials are used in production. Although the exemplary embodiments use industrial gloves, some sensors could also be embedded in the identification (ID) badge affixed to the operator, and other PPEs such as helmets, safety glasses, respirators, protective clothing, or safety footwear to track operator activities in the work cell. While the welding trade has been used to illustrate the disclosed monitoring system, the described techniques can be applied to improve overall equipment effectiveness (OEE) and reduce waste in any other fabrication trades requiring the use of protective wearables/gloves, such as assembly, cutting, grinding, outfitting, testing, surface coating, transportation, rigging, etc. Ultimately, this provides a new data-driven modality to systematically eliminate waste in human production activities to drive continuous and sustainable improvement.

What is claimed is:

1. A manually operated machine tool operations activity monitor system, comprising:
   personal protective equipment (PPE) configured to be worn by an operator;
   sensors, incorporated into the PPE and configured to capture time-series data representative of activity performed with the PPE; and
   a processor to receive and analyze the time-series data, and classify the activity performed with the PPE based on the time-series data, wherein the processor is configured to execute distance or interval-based machine learning algorithms on the time-series data using at least one of a convolutional neural networks (CNN), or a recurrent neural networks (RNN).

2. The system of claim 1, further comprising tool sensors to sense operating conditions of at least one machine tool, wherein the processor is configured to analyze the operating conditions in combination with the time-series data.

3. The system of claim 2, wherein the at least one machine tool comprises welding, cutting, or metal fabrication equipment.

4. The system of claim 2, wherein the processor evaluates an activity state of the PPE and an on/off state of the at least one machine tool based on the time-series data and the operating conditions.

5. The system of claim 1, wherein the sensors comprise at least one of a motion sensor, position sensor, an acoustic emission sensor, a force sensor, a temperature sensor, or an optical sensor.

6. The system of claim 5, wherein the optical sensor comprises a barcode scanner or a QR code scanner.

7. The system of claim 1, wherein the time-series data includes at least one of motion or location data related to the activity performed with the PPE.

8. The system of claim 1, further comprising an ID badge, configured to be worn by the operator, the ID badge comprising additional sensors configured to capture additional time-series data representative of activity performed by the operator.

9. The system of claim 1, wherein the processor is configured to sequence physical activities of the operator in production or manufacturing routines based on the time-series data.

10. The system of claim 1, wherein the PPE is at least one of an industrial glove, a helmet, safety glasses, a respirator, clothing, or footwear.

11. The system of claim 1, wherein the sensors comprise at least one of an inertial measurement unit (IMU) sensor, an accelerometer, a gyroscope, or a wireless IMU (WIMU).

12. The system of claim 1, wherein the PPE comprises a near-field communication (NFC) scanner or a radio frequency identification (RFID) reader to identify hand tools or work material, or to locate a physical location of the operator in a work cell.

13. The system of claim 1, wherein the PPE comprises a human-machine interface (HMI) element including at least one of a vibrator, a buzzer or speaker, a light emitting diode (LED), or a liquid crystal display (LCD).

14. The system of claim 1, wherein the processor is configured, based on the time-series data, to detect unsafe operator behavior or an unsafe work condition, to generate a corresponding alert or warning, or to shut down a machine tool being used by the operator.

15. A manually operated machine tool operations activity monitor system, comprising:
   personal protective equipment (PPE) configured to be worn by an operator;
   sensors, incorporated into the PPE and configured to capture time-series data representative of activity performed with the PPE; and
   a processor to receive and analyze the time-series data, and classify the activity performed with the PPE based on the time-series data,
   wherein the PPE comprises a wireless transmission device configured to communicate with the processor to track a location of the operator within a work cell by proximity of the PPE to designated radio tags/readers installed in different zones inside the work cell.

16. The system of claim 15, wherein the PPE is at least one of an industrial glove, a helmet, safety glasses, a respirator, clothing, or footwear.

17. The system of claim 15, wherein a manually operated machine tool that is monitored by the manually operated machine tool operations activity monitor system comprises welding, cutting, or metal fabrication equipment.

18. A method, comprising:

receiving time-series data from a sensor incorporated into personal protective equipment (PPE) worn by an operator, the time-series data being representative of activity performed with the PPE;

analyzing the time-series data;

classifying the activity performed with the PPE based on the time-series data;

receiving data representative of operating conditions of at least one machine tool; and performing the classifying also based on the operating conditions.

19. The method of claim 18, wherein the at least one machine tool comprises welding, cutting, or metal fabrication equipment.

20. The method of claim 18, wherein the PPE is at least one of an industrial glove, a helmet, safety glasses, a respirator, clothing, or footwear.

\* \* \* \* \*